United States Patent [19]

Mott

[11] Patent Number: 4,504,246
[45] Date of Patent: Mar. 12, 1985

[54] REVISED SPLINE DRIVE FOR METAL BELT CVT

[75] Inventor: Philip J. Mott, Des Plains, Ill.

[73] Assignee: Borg-Warner Corporation, Chicago, Ill.

[21] Appl. No.: 561,482

[22] Filed: Dec. 14, 1983

[51] Int. Cl.³ ............................................. F16H 55/56
[52] U.S. Cl. ............................................ 474/8; 474/43
[58] Field of Search .......................... 474/8, 43, 44, 45

[56] References Cited

U.S. PATENT DOCUMENTS

| | | | |
|---|---|---|---|
| 2,677,283 | 5/1954 | Firth | 474/43 X |
| 2,803,143 | 8/1957 | Michie | 474/8 X |
| 4,043,212 | 8/1977 | Warner | 474/8 X |
| 4,061,047 | 12/1977 | Newhouse | 474/8 X |
| 4,304,150 | 12/1981 | Lupo et al. | 74/677 |

FOREIGN PATENT DOCUMENTS

| | | | |
|---|---|---|---|
| 849941 | 7/1952 | Fed. Rep. of Germany | 474/43 |
| 2263207 | 6/1974 | Fed. Rep. of Germany | 474/8 |

Primary Examiner—James A. Leppink
Assistant Examiner—Frank H. McKenzie, Jr.
Attorney, Agent, or Firm—Aubrey L. Burgess

[57] ABSTRACT

A variable pulley transmission in which each pulley is constructed of a pair of flanges coupled to respective shafts, at least one flange of each pair being axially movable relative to the other flange of the same pair, the movable flange being coupled to its shaft by an external spline operative associated with the flange meshing with an internal spline on a drive member coupled to the shaft. The spline connection permits the flange to move axially while maintaining the drive coupling.

5 Claims, 4 Drawing Figures

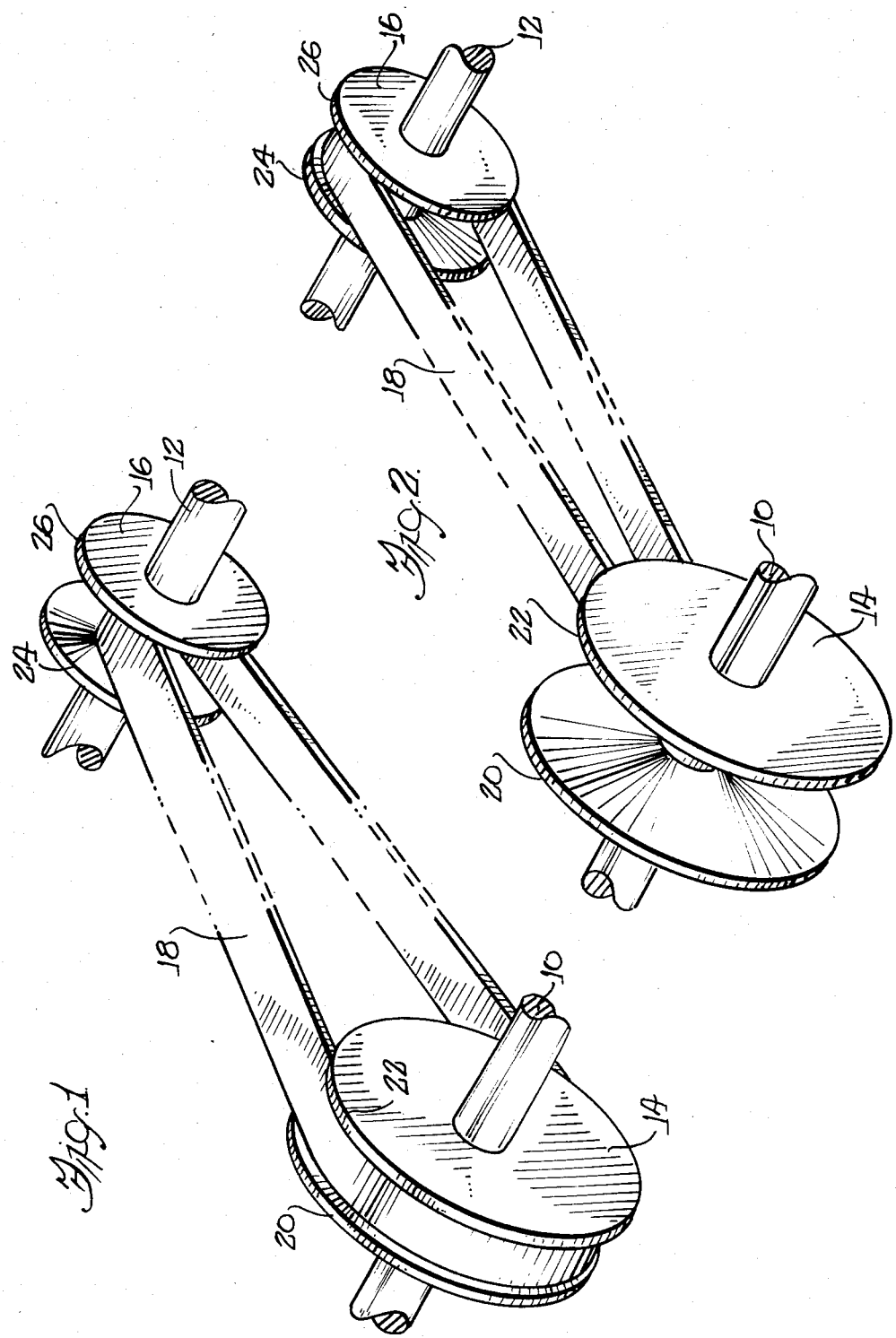

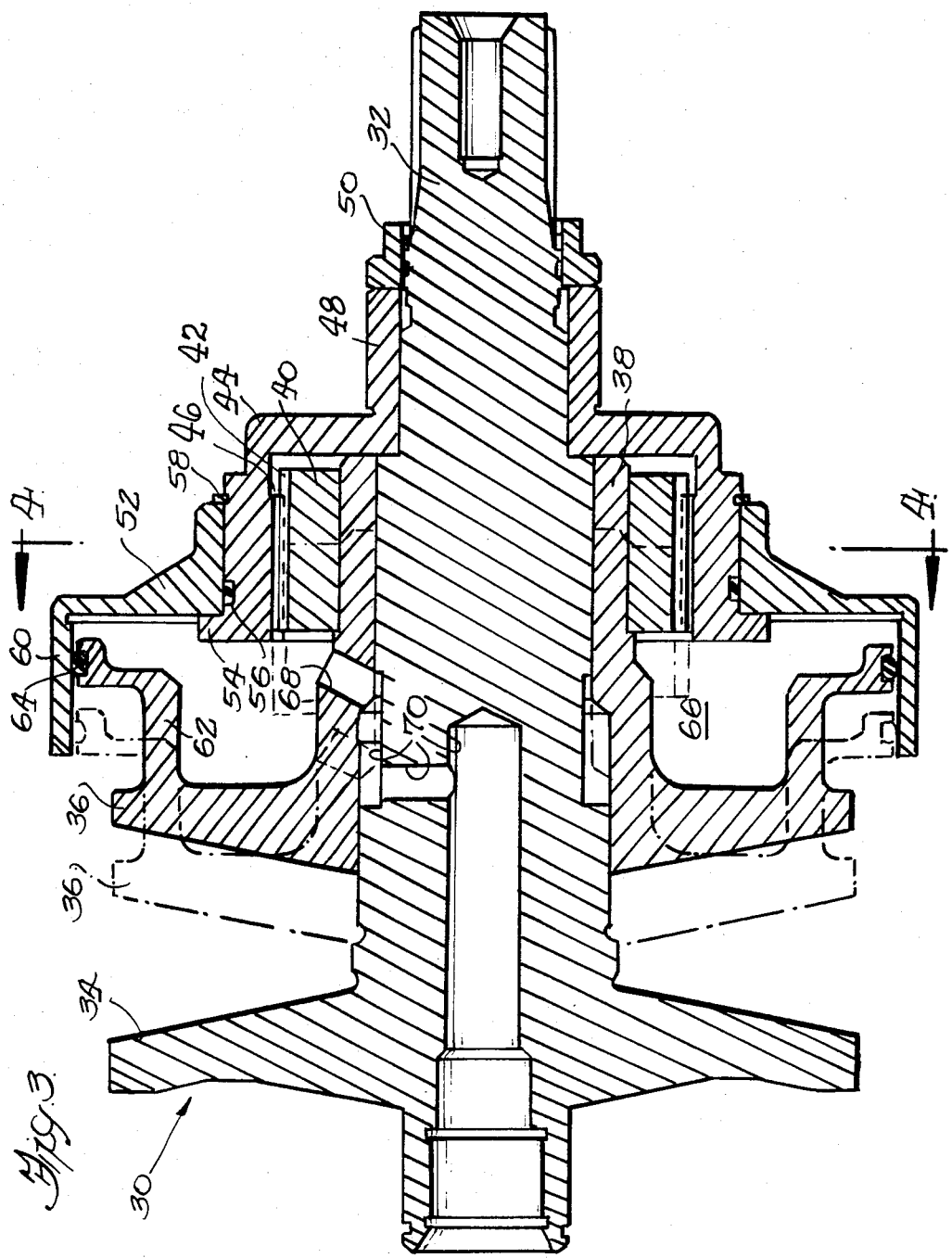

REVISED SPLINE DRIVE FOR METAL BELT CVT

BACKGROUND OF THE INVENTION

The present invention relates to a continuously variable transmission, at times referred to as a CVT. Transmissions of this type are well known in the art, and comprise a pair of cone pulleys, each comprising a pair of sheaves or flanges, the pulleys being drivingly interconnected by a belt or the like. In the usual CVT, one pulley is connected to a drive shaft. At least one flange of each pulley is axially movable, with respect to the other flange, on its respective shaft. By varying the spacing between each pair of flanges of each pulley, continuous adjustment of the drive ratio can be provided between the shafts within the limits of pulley sizes. Means are usually provided for initiating the drive ratio changes and the prior art is replete with techniques of such means.

The axially movable flange of each pulley or a hub of such flange may be, according to the prior art, each provided with an internal keyway to receive a key received in a keyway in the respective shaft, thus providing the driving connection between flange and shaft while permitting the axial movement of the flange. Lubricating the key-keyway connection is difficult at times. Thus the key binds in the keyways and the movable flange behaves as a fixed flange, so that drive ratio changes are impeded. Loading on the key, under these circumstances, becomes excessive because of the physical mass of the pulley rotating at relatively high speeds, leading to premature failure of the transmission.

Another form of movable flange-shaft connection is the ball-spline in which a plurality of balls are used with a spline, the balls functioning as anti-friction elements. The ball-spline connection is located internally of the flange and/or its hub. Ball-spline connections are expensive and also require continual lubrication to insure continued performance. Loading on the spline of the ball-spline connection can also become excessive, leading to premature failure of the connection.

SUMMARY OF THE INVENTION

The variable pulley transmission, according to this invention, comprises the usual pair of interconnected cone pulleys, each having a pair of flanges, with at least one flange of each pair being axially movable with respect to the other flange of the pair, along its respective shaft. However, the driving connection between the axially movable flange of a pulley and its shaft is modified in such a manner that belt loads are not absorbed by a splined drive connection but are totally transmitted to the shaft-pulley or sheave interface.

More specifically, the axially movable flange of each pulley is formed with an axially extending shoulder internally finished to surround, and be axially movable with respect to, its shaft. A cylindrical, externally splined ring is press-fit over the shoulder of the flange. An axially extending flange of a cup-shaped torque transfer member is press-fit onto the shaft, and is provided with an internal spline which mates with the external spline of the pulley flange. The external spline is capable of axial movement with respect to the internal spline. A second cup-shaped housing member surrounds and is connected to the torque transfer member such that an axially extending cylindrical portion of the pulley flange forms a cylindrical cavity. Passage means provide a path for lubricant to flow into the cavity which has, within its boundaries, the internal-external spline arrangement described, thus insuring continued lubrication of the spline connection.

BRIEF DESCRIPTION OF THE DRAWINGS

FIGS. 1 and 2 are perspective illustrations of a variable pulley transmission arrangement in two drive ratios;

FIG. 3 is a cross-sectional view through one of the pulleys of a pulley transmission constructed according to this invention, illustrating one extreme position of a pulley flange in solid lines and the other in broken lines.

DETAILED DESCRIPTION OF THE PREFERRED EMBODIMENT

Figure 4:
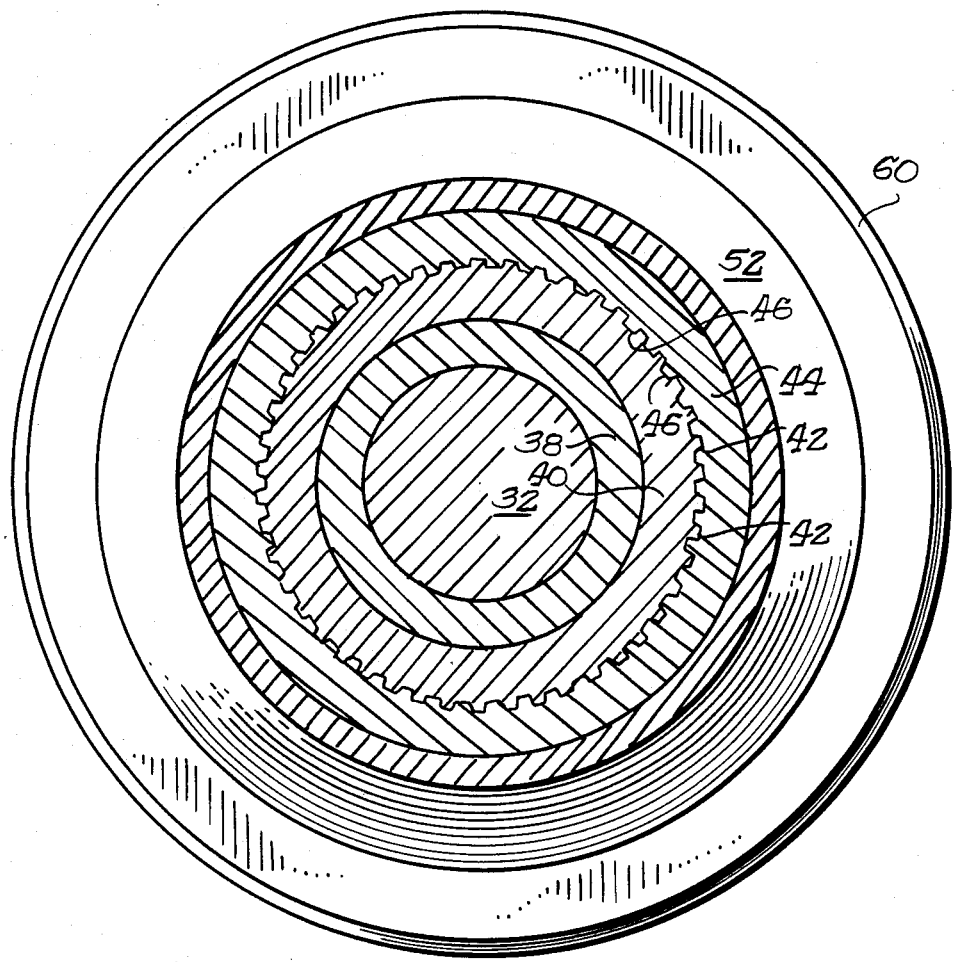
FIG. 4 is a cross-sectional view, taken on line 4—4 of FIG. 3.

FIGS. 1 and 2 illustrate, schematically, a continuously variable pulley transmission (CVT) which comprises first and second shafts 10 and 12, each having drivingly connected thereto a cone pulley, 14 and 16, respectively, intercoupled by a belt means 18. One of the shafts is a drive shaft connected to a power source, such as the engine of a motor vehicle (not shown), and the other shaft is a driven shaft connected to the output mechanism (not shown) of the driven device. The pulley 14 comprises a pair of sheaves or flanges 20, 22, at least one of which is axially movable with respect to the other along shaft 10. The pulley 16 comprises a pair of sheaves or flanges 24, 26, at least one of which is axially movable with respect to the other along shaft 12. As observed, the two drive ratios depicted are the extreme ratios, it being understood that drive ratios between the extremes are provided depending upon the position of the belt with respect to the pulleys, or, in other words, depending upon the spacing of the pulley flanges in the transmission. While the pulleys are illustrated in FIGS. 1 and 2 as having different diameters, they could be of the same diameter without departing from the spirit of the invention.

FIGS. 3 and 4 are particularly useful in describing the present invention. Only one of the two cone pulleys is illustrated, as the driving construction of the omitted pulley is substantially the same as that illustrated.

In FIGS. 3 and 4, the pulley 30 (shown in solid lines in one extreme drive ratio and in broken lines in the other extreme drive ratio in FIG. 3) is drivingly connected to the shaft 32. Pulley 30 comprises a first flange 34, illustrated as integrally formed with the shaft 32 and a second flange 36 axially movable with respect to the flange 34 along shaft 32. The flange 36 is formed with a rearwardly extending, generally cylindrical hub 38 which has an internal diameter sized to be axially slidable on the shaft 32, and an external cylindrical surface onto which a ring member 40 is press-fit. The ring member 40 is externally splined, as best illustrated in FIG. 4, to thus present a plurality of external splines 42. The ring member 40 can, if desired, be made integral with hub 38 of flange 36.

A cup-shaped drive member 44 is internally splined to present a plurality of internal splines 46 which mesh with splines 42. The member 44 has an axially extending cylindrical portion 48 press-fit or otherwise secured onto the shaft 32, thus providing a driving connection between the flange 36 and the shaft 32 with the splined connection permitting axial movement of the flange 36 relative to the shaft. A retaining nut 50 received on a threaded part of the shaft 32 insures the axial positioning of the drive member 44 on the shaft.

A cup-shaped closure member 52 surrounds the drive member 44, and abuts a flange 54 of that drive member. Member 52 is sealed thereto by an O-ring 56 and positioned by a snap ring 58. The member 52 has a forwardly extending flange 60, which surrounds a rearwardly extending flange 62 of the pulley flange 36. An O-ring 64 seals the flange 60 to the flange 62, yet permits axial movement therebetween. The structure described defines a chamber 66 into which oil is permitted to flow through a passage-way 68 in the hub 38, and passageways 70 in the shaft 32, from a sump (not shown). Oil is also discharged from chamber 66 through the described passageways, when the effective pulley diameter is increased. Some of the oil from the chamber 66 insures adequate lubrication of the spline connection, lubrication of the shaft-hub juncture and lubrication of the flange 60-flange 62 juncture.

The appended claims are intended to cover all reasonable equivalents of the structure described.

I claim:

1. In a variable pulley transmission comprising:

a drive shaft and a driven shaft, a drive pulley connected to said drive shaft, said drive pulley having a pair of flanges defining a generally V-shaped space therebetween with at least one flange being axially movable with respect to the other and to said drive shaft, a driven pulley connected to said driven shaft, said driven pulley having a pair of flanges defining a generally V-shaped space therebetween with at least one flange being axially movable with respect to the other and to said driven shaft, means drivingly interconnecting said drive and driven pulleys, means drivingly connecting said axially movable flanges to their respective shafts while permitting the axial movement thereof; the improvement wherein said drivingly connecting means comprises:

an external spline on each axially movable flange;
coupling members each connected to a shaft; and
an internal spline on each coupling member meshing with the external spline on the respective axially movable flange.

2. In a variable pulley transmission as recited in claim 1, in which each axially movable flange is constructed with a cylindrical hub surrounding its respective shaft and a ring is drivingly connected to said hub, said ring having a plurality of external splines thereon.

3. In a variable pulley transmission as recited in claim 2, in which each said coupling member has a cup-shaped portion and said cup-shaped portion has thereon a plurality of internal splines.

4. In a variable pulley transmission as recited in claim 3 in which each said coupling member is secured on its respective shaft and further comprising threaded means further securing each coupling means to its respective shaft.

5. A pulley for a variable pulley transmission comprising:

a pair of pulley flanges defining a V-space therebetween, one flange being fixedly positioned and the other being axially movable with respect to the fixedly positioned flange;

means for imparting rotation to said pulley, said means comprising a rotating means, means connecting said fixedly positioned flange to said rotating means; and means for connecting said axially movable flange to said rotation means while permitting the axial movement thereof, said means comprising an externally splined member connected to said axially movable flange and a meshing internally splined coupling member connected to said rotation means.

* * * * *